United States Patent [19]

Corallo

[11] Patent Number: 4,811,524
[45] Date of Patent: Mar. 14, 1989

[54] CYLINDER GRINDING MACHINE WITH TRACING AND DIMENSIONAL AND SURFACE CHECKING

[75] Inventor: Valeriano Corallo, Torino, Italy

[73] Assignee: Giustina International S.P.A., San Mauro Torinese, Italy

[21] Appl. No.: 28,480

[22] Filed: Mar. 20, 1987

[30] Foreign Application Priority Data

Mar. 20, 1986 [IT] Italy .................. 19820 A/86

[51] Int. Cl.⁴ .................................. B24B 51/00
[52] U.S. Cl. .................. 51/165 R; 51/165.91; 51/49; 51/289 R; 33/783
[58] Field of Search ............... 51/2 T, 165 R, 165.83, 51/165.74, 165.88, 165.91, 289 R, 49 R, 50 H, 50 R, 49; 33/143 M, 147 E, 147 L, 158, 159

[56] References Cited

U.S. PATENT DOCUMENTS

| | | | |
|---|---|---|---|
| 2,281,817 | 5/1942 | Asbridge | 51/165.76 |
| 3,109,265 | 11/1963 | Wiatt et al. | 51/165 R |
| 3,187,468 | 6/1965 | Grzymek | 51/165 R X |
| 3,353,302 | 11/1967 | Lowy | 51/49 |
| 3,455,064 | 7/1969 | Strom et al. | 51/165 R X |
| 3,552,066 | 1/1971 | Gladstone | 51/49 |
| 3,568,372 | 3/1971 | Asano et al. | 51/165 R |
| 3,603,044 | 9/1971 | Price | 51/165.74 X |
| 3,622,287 | 11/1971 | Kurimoto et al. | 51/165 R |
| 3,691,698 | 9/1972 | Schaller | 51/165.88 |
| 3,745,660 | 7/1973 | Asano et al. | 33/147 E |
| 3,851,396 | 12/1974 | Klabunde | 33/147 E X |
| 3,887,857 | 6/1975 | Elbling | 51/165.77 X |
| 3,962,792 | 6/1976 | Stepanek et al. | 33/147 L X |
| 4,077,163 | 3/1978 | Bennett et al. | 51/49 X |
| 4,480,412 | 11/1984 | Shank et al. | 51/165 R |
| 4,498,259 | 2/1985 | Yamamoto et al. | 51/165.71 |
| 4,524,546 | 6/1985 | Hoover et al. | 51/165 R |

Primary Examiner—Frederick R. Schmidt
Assistant Examiner—Shirish Desai
Attorney, Agent, or Firm—Herbert Dubno

[57] ABSTRACT

A cylinder grinding machine with devices for tracing and dimensional and surface checking has a front bench provided with rests for supporting the workpiece and a head and a counterhead for rotation and longitudinal restraint of the workpiece. A rear bench supports a carriage longitudinally movable on it parallel to the axis of the workpiece. On the carriage there is a wheelhead movable perpendicularly to the axis of the piece bearing the grinding tool. A third bench is rigid with the front bench and is located opposite the second bench. On the third bench a measuring carriage supporting more instruments tracing the dimensions and surface of the workpiece, operating both in contact and without contact with the workpiece, is movable. The carriage is provided with motorized devices which are autonomous and independent of the movements of the carriage supporting the wheelhead, it being possible for the measurement by such instruments to be carried out at the same time as machining and independently of it.

4 Claims, 3 Drawing Sheets

CYLINDER GRINDING MACHINE WITH TRACING AND DIMENSIONAL AND SURFACE CHECKING

FIELD OF THE INVENTION

The present invention relates to a grinding machine for cylinders workpieces with devices for tracing and dimensional and surface checking which move and operate during grinding in a way which is independent of the movement of the carriage carrying the tool.

BACKGROUND OF THE INVENTION

In order to carry out or repeat the grinding of cylindrical objects, for example cylindrical workpieces forming the rolls of rolling mills and the like, in an automatic cycle without operators, it is necessary to effect tracing of the geometry and monitoring of the surface condition of the workpiece during grinding in order to influence the grinding cycle in progress as a function of these measurements and to guarantee the maximum precision demanded for such work.

Such operations are carried out by means of transducers operating both in contact with the surface and at a distance from it (i.e. contactless sensors), in which, in the case of known grinding machines, are mounted on the moveable carriage supporting the grinding tool, and scan the surface following the movement of the tool.

This means that the speed of scanning the workpiece and the speed of machining it must be the same. However, some types of tracing require scanning times substantially longer than the times required for the tool to perform a grinding pass and, therefore, it is necessary either to reduce the grinding speed to adapt it to the speed required by the tracing devices, with a consequent prolongment in grinding times, or to carry out only a partial tracing of the piece with incomplete scanning of its surface during each pass by the tool, arriving at its complete tracing by statistical means after a number of passes.

Furthermore, the positioning of measuring instruments in the vicinity of the tool may lead to a reduction in the life of such devices, owing to the presence of swarf and of vapors caused by the grinding process. In addition, it is possible for vibration to occur in the carriage carrying the tool as a result of the grinding operation, and such vibration may be transferred to the measuring instruments, reducing the precision of the measurements registered by them, when these instruments are mounted on the tool carriage.

OBJECT OF THE INVENTION

There is, therefore, the object of the invention to provide a grinding machine which solves such problems enabling a scanning of the workpiece independently ov the movement of the grinding tool and also maintaining the tracing instruments in a protected position, well away from possible sources of disturbance.

SUMMARY OF THE INVENTION

This object is achieved by the present invention, which provides a grinding machine for cylinders with devices for tracing and dimensional and surface checking.

According to the invention the machine comprises a front bench provided with rests for supporting the workpiece and a headstock and a tailstock for rotation and longitudinal restraint of the workpiece, and a rear bench or bed supporting a longitudinally movable carriage parallel to the axis of the workpiece, on which a wheelhead is movable on it perpendicularly to the axis of the workpiece and bearing the grinding tool. A third bench or bed is rigid with the front bench or bed and is located opposite the second bench. On the third bed is moveably mounted, with an axis parallel to the axis of rotation of the workpiece, a measuring carriage supporting a plurality of instruments tracing the dimensions and surface of the piece, operating both in contact and without contact with the workpiece. The measuring carriage is provided with motorized devices which are autonomous and independent of the movements of the carriage supporting the wheelhead, it being possible for the measurements of such instruments to be carried out at the same time as machining and independently of it.

In particular, the measuring carriage supports a frame extending upward, on which there is provided a gauge having a pair of arms to fit around and straddle the workpiece, in contact with two diametrically opposed surface areas of the workpiece and, associated with means for tracing the movements of the arms themselves in contact with the workpiece.

On the frame supported by the measuring carriage there is a telescopic arm having an axis perpendicular to the axis of rotation of the workpiece. This arm has a portion which is moveable with respect to the workpiece, and at the end of which there are instruments for tracing the surface and structural characteristics of the workpiece, such instruments being able to operate at a speed for scanning the workpiece independent of the grinding speed.

BRIEF DESCRIPTION OF THE DRAWING

The invention is described in greater detail below with reference to the accompanying drawing, in which.

SPECIFIC DESCRIPTION

Figure 1:
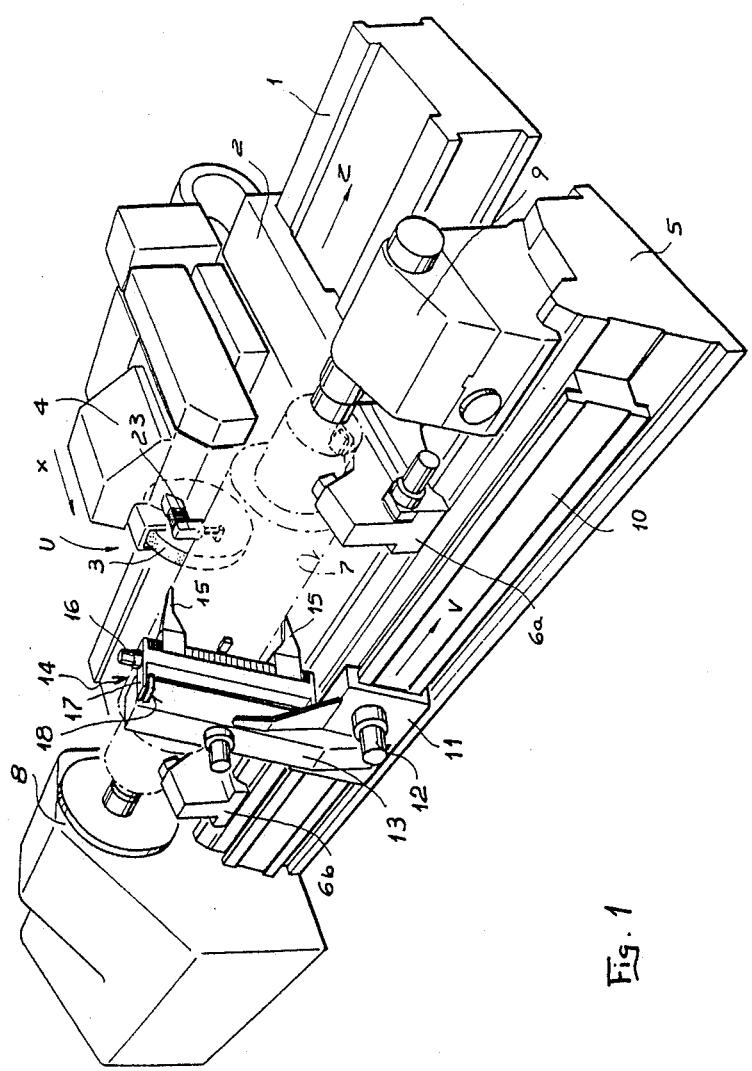
FIG. 1 is an overall perspective view of a grinder according to the invention.

The cylinder grinding machine comprises a rear bench or bed 1, on which the main or tail carriage 2 is mounted in sliding manner in the direction Z and carries the tool 3 in the form of a grinding wheel.

The carriage 2 is provided with motorized devices, not shown, suitable for effecting the traversing commanded along the rear bed 1, over the entire working length.

The wheel 3 is supported by the respective bearing and powering devices 4, by means of which it is set in rotation and can be moved on the carriage 2 in the direction X, perpendicular to the direction Z, and lowered in the direction U, for the main movement of advance toward the workpiece and the precision advance movement.

In parallel to the rear bed 1 there is also a front bed 5, on which are located the rests 6a, 6b for supporting the cylinder 7 (workpiece) to be ground and indicated by dot-dash lines in FIG. 1. also has a workhead or headstock 8 and a counterhead or tailstock 9, having devices for rotating the workpiece and for holding the same in the longitudinal direction against axial displacement.

Also fixed to the front bed 5 is a third longitudinal bed 10, which has guides for the sliding of a measuring carriage 11, movable in the direction V, parallel to the axis Z, by means of an independent motorized device 12.

On the carriage 11 there is a projecting frame 13, extending upwardly, which carries a gauge 14 provided with measuring arms 15 forming a measuring caliper, which can be moved by means of a motorized device 16 and respective means of transmission to straddle the workpiece during grinding to effect a dimensional tracing.

The ends 15a of the arms 15 are aligned and moveable along an oblique axis C, intersecting the longitudinal axis of the workpiece 7, and defining the axis of measurement of the diameter of the workpiece.

Figure 2:
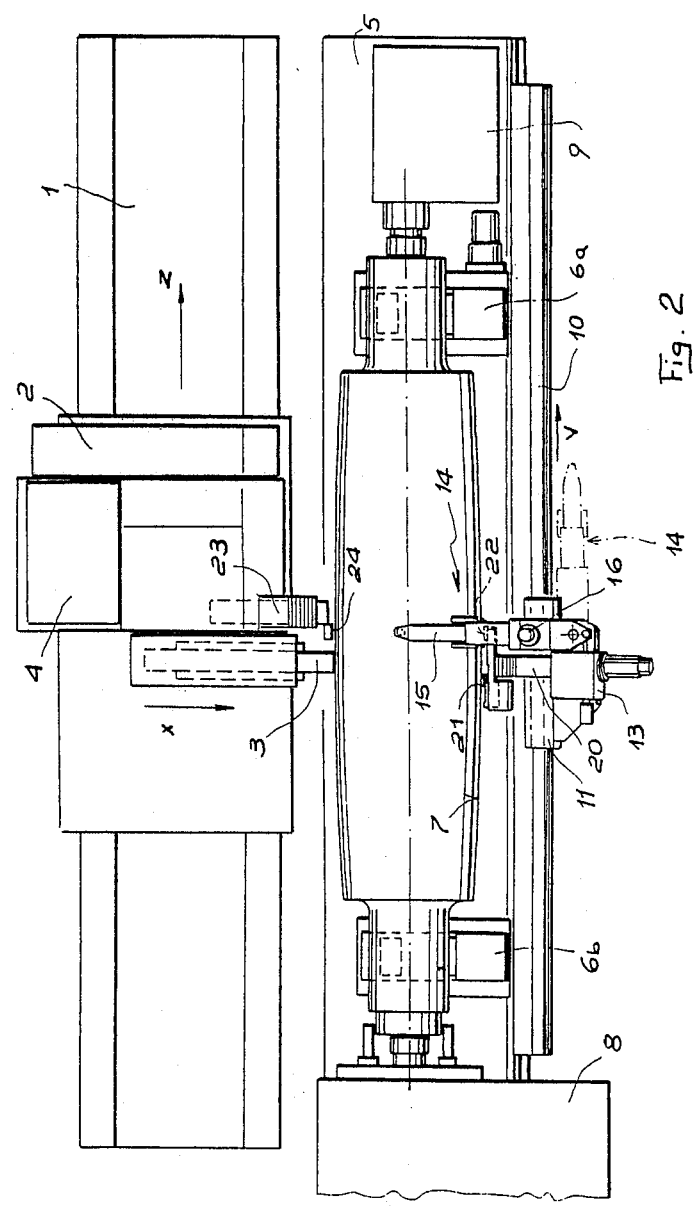
FIG. 2 is a plan view of the grinder of FIG. 1.

The gauge 14 is supported by the frame 13 by means of protruding tongues 17, pivoted to corresponding mountings 18 of the frame and is, therefore, swingable laterally, as represented in FIG. 2 by the dot-dash line, to remove the arms 15 of the gauge from the region of the workpiece, so that positioning and removal of the workpiece is permitted.

Figure 3:
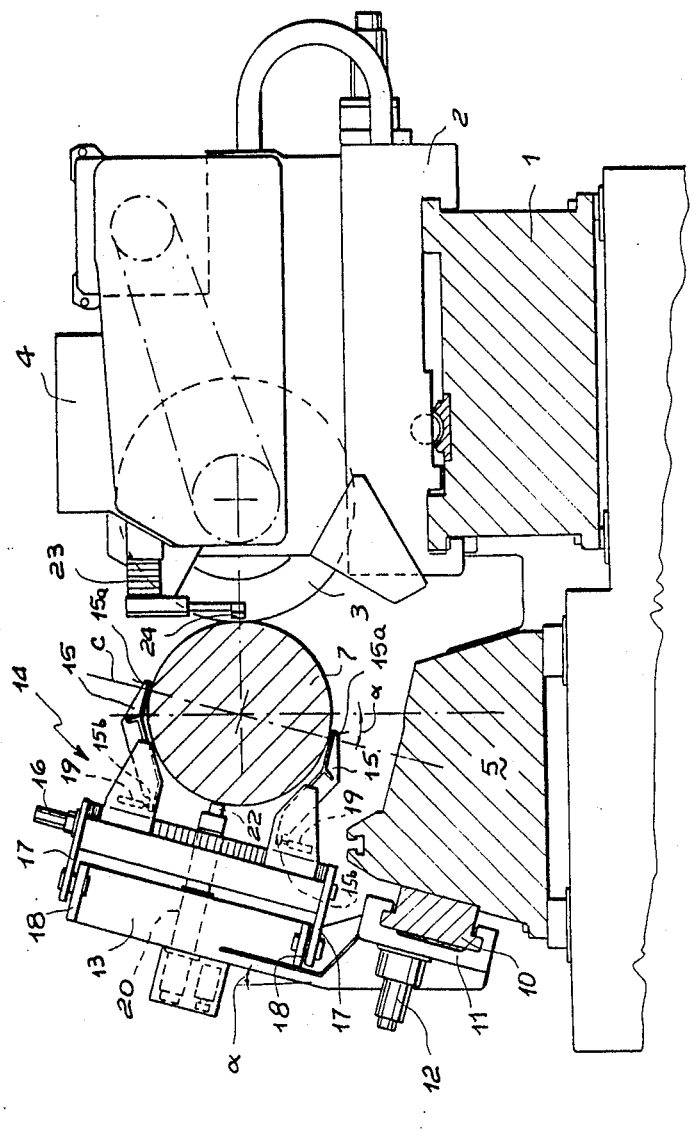
FIG. 3 is a section taken along the line III—III of FIG. 2.

As shown in FIG. 3, at the opposite ends 15b of the arms 15 of the gauge are connected the position transducers 19, suitable for following the movements of the arms themselves and signalling their contact with the surface of the cylinder.

The frame 13 also has a telescopic arm 20, which carries a transducer 21 for measuring the roughness of the workpiece, and on which there is also a transducer for measuring the structural defects 22 of the surface of the workpiece, operating at a distance from the workpiece, i.e. a contactless surface monitoring transducer.

The carriage 4 carries, alongside the wheel 3 a slide 23, movable perpendicularly to the axis of the workpiece, on which there is a measuring transducer 24 capable of measuring its distance from the surface of the piece to be ground, for example by the use of eddy currents, and such as to permit a check to be kept in this way on the wear of the wheel.

The slide 23, is operated, for its movement perpendicular to the axis of the cylinder 7, by means of perspective motorized devices, not shown.

The frame 13 is provided with a slope at an angle with respect to the vertical, of between 10° and 30°, preferably 15°, which keeps its center of gravity in the position close to the carriage 11, and on its vertical edge, so as to assure the maximum stability for the gauge 14, and thus guarantee greatest reliability of the measurements made.

To such an end, particular importance is attributable to the positioning of the gauge and of the other measuring devices on a carriage separate from the wheel-carrying carriage 2, and at a distance from it, because in this way the measuring instruments are safe from the swarf and vapors due to grinding, and furthermore the inevitable vibrations due to the action of the wheel are not transferred to the measuring instruments.

I claim:

1. A grinding machine for elongated generally cylindrical workpieces, comprising:
   a longitudinally extending front bed formed with a headstock and a tailstock for rotatably receiving an elongated generally cylindrical workpiece to be ground and for rotating said workpiece about a generally horizontal axis;
   a longitudinally extending rear bed extending parallel to said front bed and provided with:
      a tool carriage longitudinally shiftable along said rear bed parallel to said axis,
      a drive connected to said tool carriage for longitudinally displacing same along said rear bed,
      a wheelhead mounted on said tool carriage for displacement thereon perpendicular to said axis, and
      a grinding tool rotatable on said wheelhead and engageable with a surface of said workpiece for grinding same;
   a further longitudinally extending bed rigid with said front bed and disposed on a longitudinal side thereof opposite that along which said rear bed extends, said further bed extending parallel to said axis;
   a measuring carriage displaceable on said further bed parallel to said axis and provided with a further drive operable independently of the drive connected to said tool carriage for displacing said measuring carriage along said further bed;
   a support extending upwardly from said measuring carriage alongside said workpiece; and
   gauge means mounted on said support and including a measuring caliper having arms diametrically straddling said workpiece for measuring a diameter thereof, and at least one sensor disposed between said arms, juxtaposed with said surface, and tracing structural characteristics and defects of said surface.

2. The grinding machine defined in claim 1 wherein said support includes a frame extending upwardly and inclined inwardly toward said workpiece, said gauge means being swingably mounted on said frame from a position in which said arms extend generally perpendicularly to said axis to a position in which said arms are disposed alongside said workpiece.

3. The grinding machine defined in claim 2 wherein said gauge means includes a telescoping arm extendable toward said workpiece and said sensor is a contactless sensor juxtaposed with said workpiece opposite a region at which said grinding wheel engages said workpiece.

4. The grinding machine defined in claim 1 wherein said wheel head is provided with a sensor for determining the position of said wheelhead with respect to said surface.

* * * * *